US 8,078,777 B2

(12) United States Patent
Staats et al.

(10) Patent No.: US 8,078,777 B2
(45) Date of Patent: *Dec. 13, 2011

(54) SYSTEMS AND METHODS FOR MANAGING A NETWORK

(75) Inventors: Robert T. Staats, Lahabra Heights, CA (US); Clifford H. Young, Marina del Rey, CA (US)

(73) Assignee: Clearpath Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/833,832

(22) Filed: Jul. 9, 2010

(65) Prior Publication Data

US 2011/0004937 A1      Jan. 6, 2011

Related U.S. Application Data

(62) Division of application No. 11/106,837, filed on Apr. 15, 2005, now Pat. No. 7,783,800.

(60) Provisional application No. 60/562,596, filed on Apr. 15, 2004.

(51) Int. Cl.
G06F 13/12       (2006.01)
G06F 13/38       (2006.01)
G06F 15/177      (2006.01)
G06F 15/173      (2006.01)

(52) U.S. Cl. .......... 710/64; 709/220; 709/221; 709/222; 709/223

(58) Field of Classification Search .................... 710/64; 709/220, 221, 222, 223
See application file for complete search history.

(56) References Cited

U.S. PATENT DOCUMENTS

| 5,889,958 | A | 3/1999 | Willens |
| 6,131,119 | A | 10/2000 | Fukui |
| 6,697,360 | B1 | 2/2004 | Gai et al. |
| 6,708,221 | B1* | 3/2004 | Mendez et al. ............... 709/248 |
| 7,380,025 | B1* | 5/2008 | Riggins et al. ..................... 710/8 |
| 2002/0078185 | A1 | 6/2002 | Swerup et al. |
| 2002/0161867 | A1* | 10/2002 | Cochran et al. ............... 709/221 |
| 2002/0174246 | A1* | 11/2002 | Tanay et al. .................... 709/238 |
| 2003/0004952 | A1 | 1/2003 | Nixon et al. |
| 2003/0065902 | A1 | 4/2003 | Shiga et al. |
| 2003/0217126 | A1 | 11/2003 | Polcha et al. |
| 2004/0010653 | A1 | 1/2004 | Grundy et al. |
| 2004/0221038 | A1* | 11/2004 | Clarke et al. .................. 709/226 |
| 2005/0101310 | A1 | 5/2005 | Shachak |
| 2005/0235360 | A1 | 10/2005 | Pearson |
| 2007/0004511 | A1 | 1/2007 | Walker et al. |

OTHER PUBLICATIONS

ISR and Written Opinion for International Application No. PCT/US05/12745 filed Apr. 15, 2005.
Non-Final Office Action for U.S. Appl. No. 11/106,837, mailed Dec. 28, 2007.
Restriction Requirement for U.S. Appl. No. 11/106,837, mailed Jul. 21, 2009.
Non-Final Office Action for U.S. Appl. No. 11/106,837, mailed Nov. 24, 2009.

(Continued)

*Primary Examiner* — Alford W Kindred
*Assistant Examiner* — Farley Abad

(57) ABSTRACT

A method of managing a network. The method includes receiving an activation key transmitted from a device connected to the network, automatically transmitting a configuration to the device, automatically maintaining the configuration of the device, and receiving log information from the device.

20 Claims, 14 Drawing Sheets

OTHER PUBLICATIONS

Notice of Allowance for U.S. Appl. No. 11/106,837 mailed Apr. 5, 2010.
First Office Action issued on Jul. 11, 2008 in Chinese Application No. 200580019475.4.
Second Office Action issued on Nov. 6, 2009 in Chinese Application No. 200580019475.4.
U.S. Appl. No. 11/106,837, filed Apr. 15, 2005.

* cited by examiner

US 8,078,777 B2

SYSTEMS AND METHODS FOR MANAGING A NETWORK

CROSS-REFERENCE TO RELATED APPLICATION

This application is a divisional application of U.S. patent application Ser. No. 11/106,837 filed Apr. 15, 2005, now U.S. Pat. No. 7,783,800 which claims the benefit under 35 U.S.C. §119(e) to U.S. Provisional Patent Application Ser. No. 60/562,596 filed on Apr. 15, 2004, the disclosure of which is incorporated herein by reference.

BACKGROUND

This application discloses an invention that is related, generally and in various embodiments, to systems and methods for managing a network.

Some network environments provide companies with critical information technology (IT) services for installing, connecting, managing and securing their network environment. However, traditional network implementations have required that network infrastructure capable of supporting computer applications be assembled using disparate hardware, software and systems that must be manually configured and managed. As a result, these traditional network implementations have been utilized primarily by large enterprises with large information technology (IT) budgets.

Small and medium businesses (SMBs) represent the majority of businesses, and their network management and security needs are no less critical that that of larger enterprises. However, due to budgetary and technological constraints, traditional secure network management systems, services, and elements are usually not a viable option for SMBs. Most SMBs lack the necessary IT staff and budget resources to effectively manage secure network environments that may be leveraged to deploy distributed applications that run on these networks and make those businesses more competitive.

SUMMARY

In one general respect, this application discloses a method of managing a network. According to various embodiments, the method includes receiving an activation key automatically transmitted from a device connected to the network, automatically transmitting a configuration to the device, automatically maintaining the configuration of the device, and receiving log information from the device.

According to various embodiments, the method includes automatically setting a default configuration for the device, automatically generating an activation key associated with a device, and automatically transmitting a provisioned configuration to the device after the device is connected to the network.

According to various embodiments, the method includes periodically polling a device connected to the network, automatically determining whether a configuration of the device is current, automatically setting a new configuration for the device when the configuration is not current, and automatically transmitting the new configuration to the device.

According to various embodiments, the method includes receiving network traffic information from a device connected to the network, automatically correlating the information, and automatically determining network performance based on the information.

According to various embodiments, the method includes receiving credentials associated with a remote access user, automatically validating the credentials, automatically determining which devices connected to the network the remote access user is authorized to connect to, and automatically transmitting to a remote access client a list of devices the remote access user is authorized to connect to.

In another general respect, this application discloses a system for managing a network. According to various embodiments, the system includes a device connected to the network and a management center in communication with the device via the Internet. The device includes a processor and a memory. The management center includes a first module for provisioning a configuration of the device, a second module for automatically transmitting the configuration to the device, and a third module for automatically maintaining the configuration of the device.

DETAILED DESCRIPTION

The systems and methods described herein may be utilized to provide for the automated delivery of managed services. It is to be understood that the figures and descriptions of the disclosed invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein.

Figure 1:
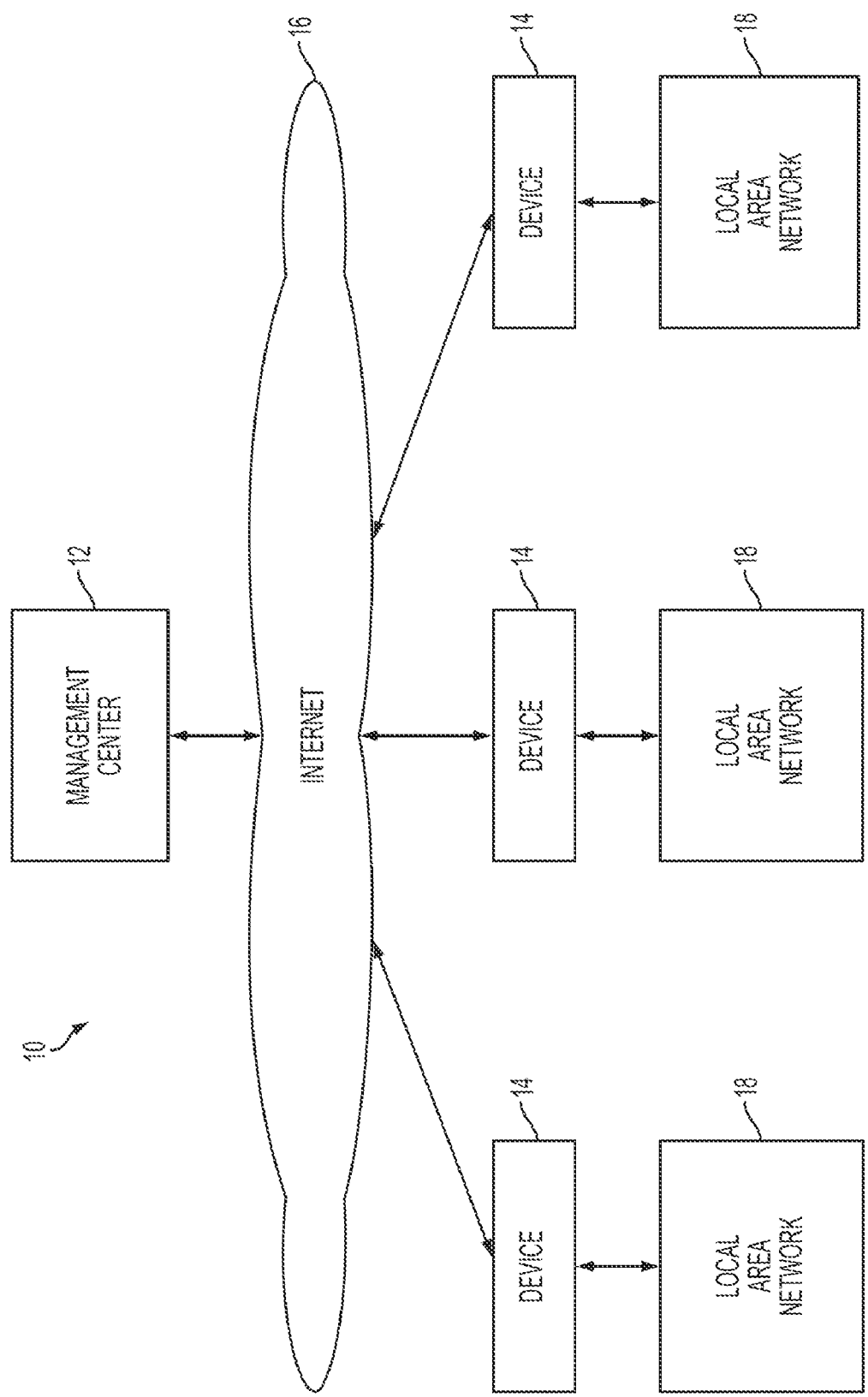
FIG. 1 illustrates various embodiments of a system for managing a network.

FIG. 1 illustrates various embodiments of a system 10 for managing a network. The system 10 may be utilized to provide a company with critical information technology (IT) services for installing, connecting, managing and securing their network environment without having to rely on several discrete systems.

According to various embodiments, the system 10 includes a management center 12 and at least one device 14 in communication with the management center 12 via the Internet 16. Although only three devices 14 are shown in FIG. 1, the system 10 may include any number of devices 14 in communication with the management center 12 via the Internet 16.

Each device 14 may be located at a different customer location, and each device 14 may be connected to a different local area network 18.

Figure 2:
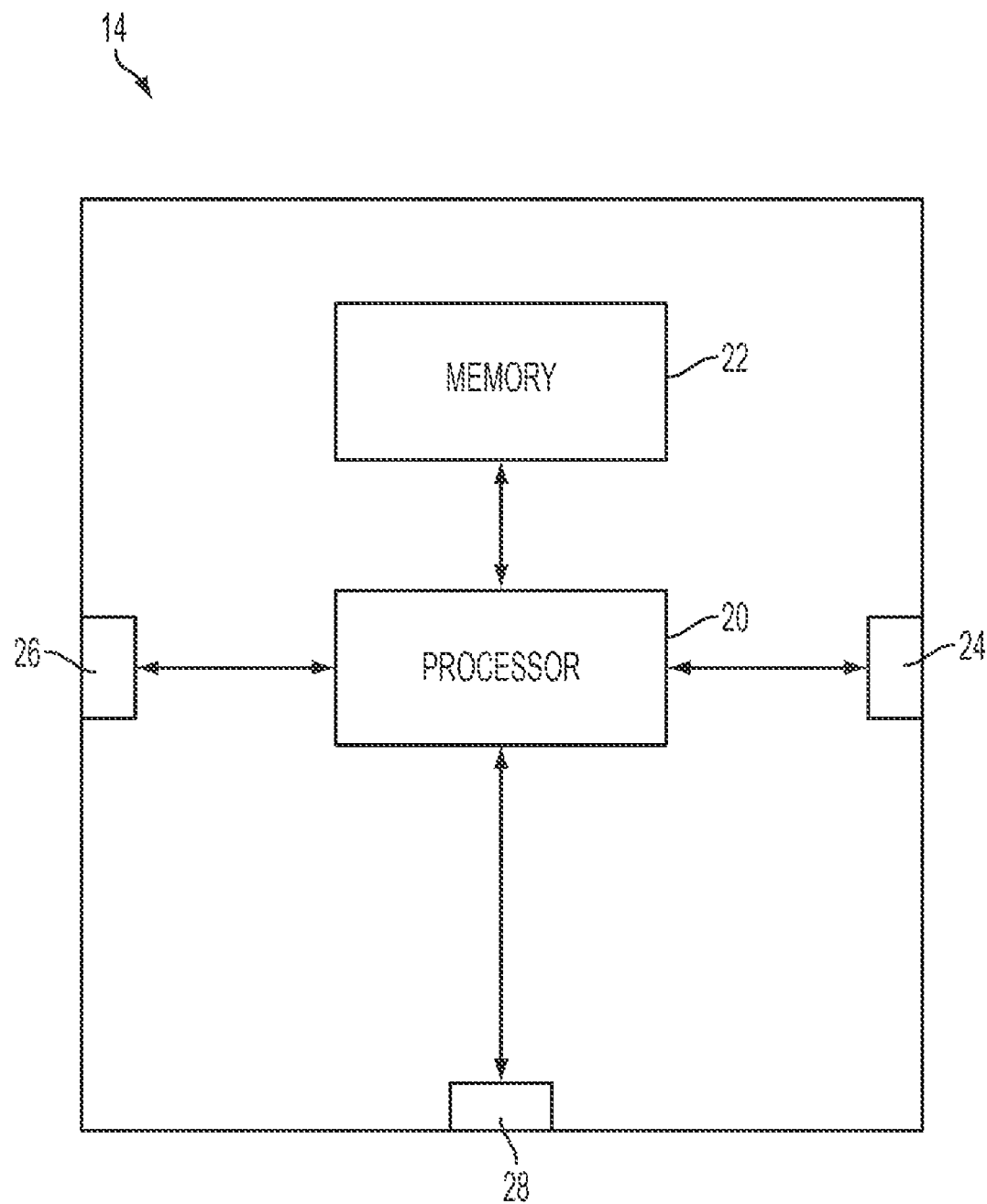
FIG. 2 illustrates various embodiments of a device.
Figure 3:
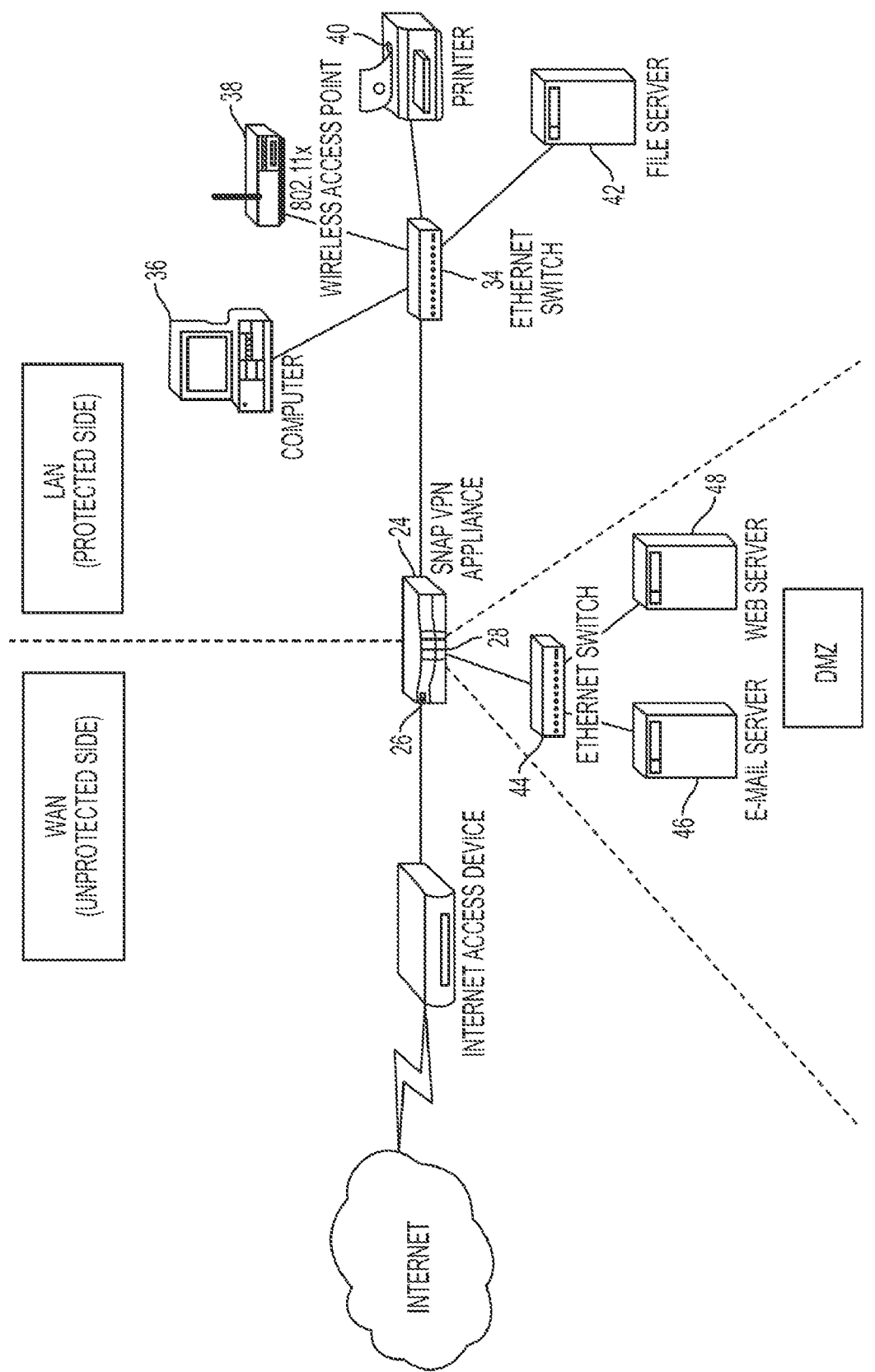
FIG. 3 illustrates various embodiments of the device.
Figure 4:
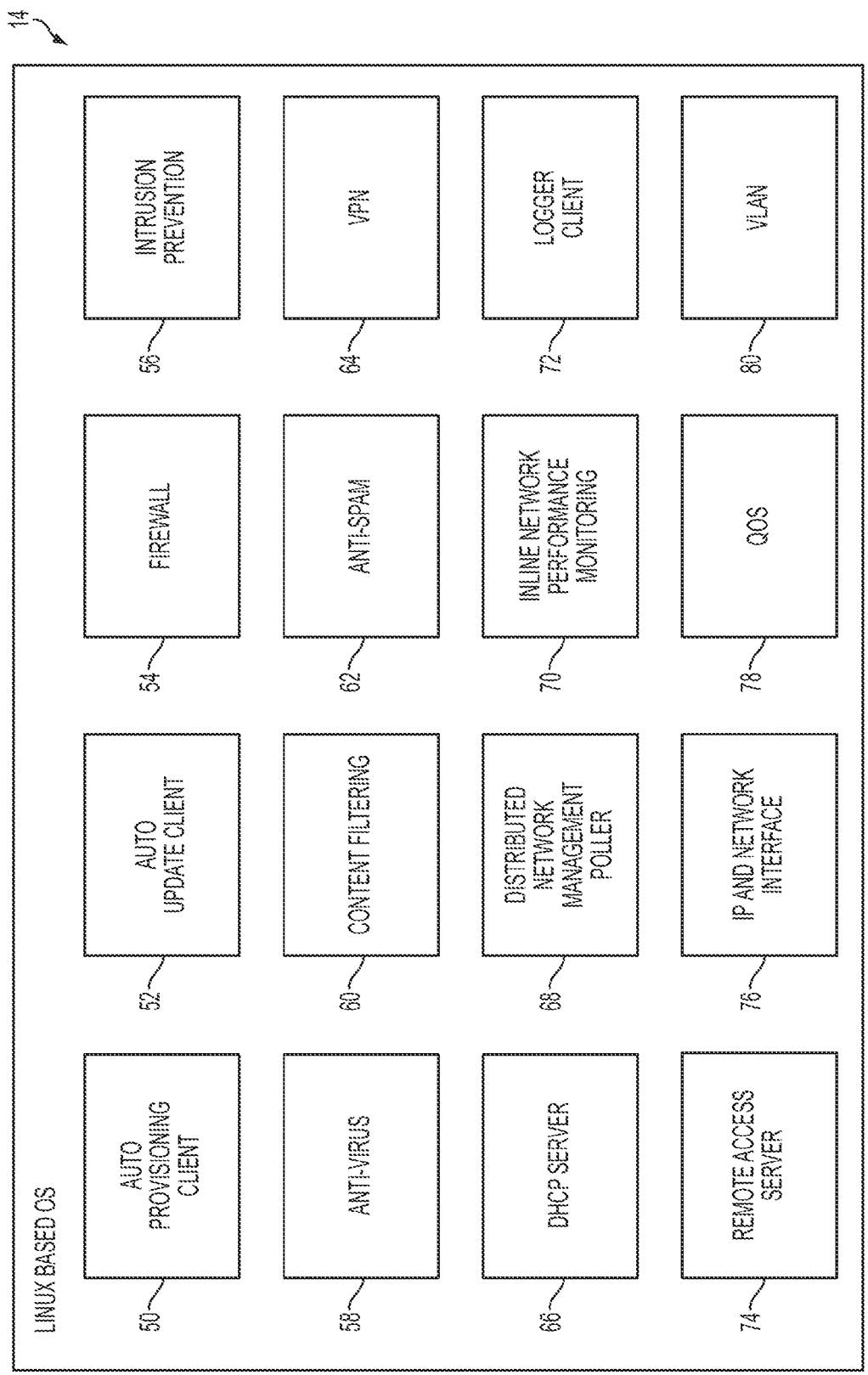
FIG. 4 illustrates various embodiments of the device.

FIGS. 2-4 illustrate various embodiments of the device 14 of FIG. 1. As shown in FIG. 2, the device 14 includes a processor 20 and a memory 22. According to various embodiments, the device 14 may also include a first fast ethernet port 24, a second fast ethernet port 26, and a third fast ethernet port 28. As shown in FIG. 3, the device 14 may be connected to a local area network 18 via the first fast ethernet port 24, to a service provider wide area network 30 via the second fast ethernet port 26, and to a demilitarized zone 32 via the third fast ethernet port 28. The device 14 may serve to act as a security device to protect the local area network 18 and the demilitarized zone 32 from outside threats originating from the wide area network 30. According to various embodiments, in lieu of being connected to the demilitarized zone 32 via the third fast ethernet port 28, the device 14 may be connected to a redundant wide area network (not shown) via the third fast ethernet port 28.

The local area network 18 may include network elements such as, for example, an ethernet switch 34, a computer 36, a wireless access point 38, a printer 40, a file server 42 and any other network elements known by those skilled in the art to comprise a portion of a local area network. The demilitarized zone 32 may include network elements such as, for example, an ethernet switch 44, an e-mail server 46, a web server 48 and any other network elements known by those skilled in the art to comprise a portion of a demilitarized zone.

As shown in FIG. 4, the device 14 may include a Linux based operating system and the following modules: an auto-provisioning module 50, an auto-update module 52, a firewall module 54, an intrusion prevention module 56, an anti-virus module 58, a content filtering module 60, an anti-spam module 62, a VPN module 64, a DHCP server module 66, a distributed network management poller module 68, an inline network performance monitoring module 70, a logger module 72, a remote access server module 74, an IP and network interface module 76, a QOS module 78, and a VLAN module 80.

The auto-provisioning module 50 of the device 14 is operable to provide the device 14 with auto-provisioning functionality. For example, according to various embodiments, the auto-provisioning module 50 allows for the device 14 to be auto-configured based on an activation code entered by an installer during installation of the device 14 at a customer location.

The auto-update module 52 of the device 14 is operable to provide the device 14 with auto-update functionality. For example, according to various embodiments, the auto-update module 52 allows for the device 14 to be automatically updated whenever updates to the device 14 are available. The updates may include, for example, operating system updates, intrusion prevention rule updates, anti-virus signature updates, and content filtering database updates.

The firewall module 54 of the device 14 is operable to provide the device 14 with firewall functionality. For example, according to various embodiments, the firewall module 54 allows for the device 14 to perform deep packet inspection, stateful inspection, network address translation, port address translation and port forwarding.

The intrusion prevention module 56 of the device 14 is operable to provide the device 14 with intrusion prevention functionality. For example, according to various embodiments, the intrusion prevention module 56 allows for the device 14 to perform real-time traffic analysis and logging, protocol analysis, and content searching and matching. The intrusion prevention module 56 may also allow for the device 14 to detect a variety of attacks and probes such as, for example, buffer overflows, operating system fingerprinting attempts, common gateway interface attacks and port scans.

The anti-virus module 58 of the device 14 is operable to provide the device 14 with anti-virus functionality. For example, according to various embodiments, the anti-virus module 58 of the device 14 allows for the device 14 to provide an Internet gateway protection service that protects against viruses and malicious code that may be downloaded from the Internet 16 to the local area network 18. According to various embodiments, the anti-virus module 58 of the device 14 allows for the integration of the device 14 and an anti-virus client installed on one or more devices that comprise a portion of the local area network 18. The anti-virus module 58 allows for the device 14 to block access to the Internet 16 for any device of the local area network 18 that does not have the most current anti-virus client and anti-virus signature database installed thereon. The anti-virus module 58 of the device 14 may redirect such blocked devices to a webpage that will allow for the device to be updated to include the most current anti-virus client and anti-virus signature database.

The content filtering module 60 of the device 14 is operable to provide the device 14 with content filtering functionality. For example, according to various embodiments, the content filtering module 60 of the device 14 allows for the device 14 to act as a transparent proxy which inspects each request made from the local area network 18 to the Internet 16. The content filtering module 60 may determine whether to grant or deny the request to access a particular website based on defined policies. For instances where the request is granted, the content filtering module 60 may further determine which types of files are allowed to be downloaded from the Internet 16 to the local area network 18. According to various embodiments, each policy may be defined as a blacklist or a whitelist. If the policy is defined as a blacklist, the content filtering module 60 operates to allow access to all sites except those explicitly defined to be blocked. If the policy is defined as a whitelist, the content filtering module 60 operates to block access to all sites except those explicitly defined to be allowed.

The anti-spam module 62 is operable to provide the device 14 with anti-spam and e-mail anti-virus functionality. For example, according to various embodiments, the anti-spam module 62 of the device 14 allows for the device 14 to act as a transparent proxy which inspects each e-mail message that transits the device 14 for viruses and malicious code. If the anti-spam module 62 identifies an e-mail as SPAM, the device 14 may block the e-mail. If the anti-spam module 62 identifies an e-mail as containing a virus, the device 14 may attempt to disinfect the e-mail. If the e-mail is cleaned, the device 14 may forward the cleaned e-mail along with a message that the e-mail contained a virus. If it is not possible to disinfect the e-mail, the device 14 may block the e-mail.

The VPN module 64 of the device 14 is operable to provide the device 14 with VPN functionality. For example, according to various embodiments, the VPN module 64 provides the encryption protocol for the automatic building of a site to site VPN which is implemented as a secure tunnel that connects two different devices 14. A secure socket layer (SSL) is used to create the encrypted tunnel between the two devices 14. In instances where a device 14 is assigned a new WAN IP Address, the VPN module 64 allows for all of the tunnels connecting the device 14 to other devices 14 to automatically reconfigure themselves to establish new tunnels to the device 14 at the new IP Address. According to various embodiments, the VPN module 64 of the device 14 allows for the cooperation of the device 14 and a remote access client.

The DHCP server module 66 of the device 14 is operable to provide the device 14 with DHCP server functionality. For example, according to various embodiments, the DHCP server module 66 allows the device 14 to provide IP addresses and configuration parameters to network devices requesting this information using the DHCP protocol. IP address pools with characteristics such as default gateways, domain names, and DNS servers can be defined. Static assignments can also be defined based on MAC address.

The distributed network management poller module 68 of the device 14 is operable to provide the device 14 with distributed network management poller functionality For example, according to various embodiments, the distributed network management poller module 68 allows the device 14 to poll network elements that comprise a portion of a local area network 18 and are in communication with the device 14. For example, the distributed network management poller module 68 may utilize Internet control message protocol pings to determine a reachability value and a latency value for one or more of the network elements. The distributed network management poller module 68 may also utilize simple network management protocol (SNMP) to poll SNMP information from network elements that are SNMP capable. Such SNMP information may include, for example, CPU utilization or server temperature.

The inline network performance monitoring module 70 of the device 14 is operable to provide the device 14 with inline network performance monitoring functionality. For example, according to various embodiments, the inline network performance monitoring module 70 allows the device 14 to inspect each packet that transits the device 14 and record certain information such as source/destination IP address, protocol, and source/destination ports.

According to various embodiments, the inline network performance monitoring module 70 also allows the device 14 to monitor all network traffic that passes between the device 14 and another device 14. Each device 14 has its time synchronized precisely to network time protocol servers (not shown). This allows for each device 14 to reference packet information with a common time reference. According to various embodiments, the inline network performance monitoring module 70 can record the exact time every packet leaves a device 14, and record items such as, for example, source/destination IP address, protocol, sequence number and source/destination port. As the packets travel across the Internet 16, the packets eventually reach the destination device 14. The inline network performance monitoring module 70 of the destination device 14 records the exact time the packet is received by the destination device 14 and items such as, for example, source/destination IP address, protocol, sequence number and source/destination port.

The logger module 72 of the device 14 is operable to provide the device 14 with logging functionality. For example, according to various embodiments, the logger module 72 allows information obtained by the device 14 (e.g., intrusion prevention detections, anti-virus detections, network device polling results, source/destination IP addresses, application performance measurements, etc.) to be recorded, processed and transmitted to the management center 12. According to various embodiments, the data collected by the inline network management monitoring module 70 of each device 14 is forwarded to the logger module 72 of the associated device 14. After receiving the data, the logger modules 72 wait a random amount of time (e.g., between approximately 120 and 240 seconds) before transmitting the data to the management center 12. This random delay is to prevent all the devices 14 from sending their data back to the management center 12 at the same time. If the management center 12 cannot be reached, the device 14 may queue the data locally until the management center 12 can be reached. When the management center 12 is reached, the logger module 72 will transmit all of the queued data. The data that is transmitted uses a system queue which insures that regular user network traffic will always have priority and this data transfer will only use the unused bandwidth on the network connection.

The remote access server module 74 of the device 14 is operable to provide the device 14 with remote access capability. For example, according to various embodiments, the remote access server module 74 allows for the cooperation of the device 14 with a remote access client.

The IP and network interface module 76 is operable to provide the device 14 with the capability to configure the network interface characteristics such as IP Address type (e.g., static IP, DHCP, or PPPOE), IP address, subnet mask, speed and duplex. The IP and network interface module 76 is also operable to provide the device 14 with the capability to configure IP routing.

The QOS module 78 of the device 14 is operable to provide the device 14 with QOS functionality. For example, according to various embodiments, the QOS module 78 allows the device 14 to selectively transmit packets based on the relative importance of the packet. The QOS module 48 may also allow the device 14 to inspect each packet and determine a particular queue to send the packet to based on defined rules. Rules may be defined, for example, based on source/destination IP address and/or port information. If a packet does not match any rule, it may be sent to a default queue.

The VLAN module 80 of the device 14 is operable to provide the device 14 with VLAN functionality. For example, according to various embodiments, the first and third fast Ethernet ports 24, 28 of the device 14 that are connected to the local area network 18 and the demilitarized zone 32 may be configured as 802.1q trunk ports. The VLAN module 80 allows the device 14 to connect to many different VLANS from an Ethernet switch that has enabled trunking.

According to various embodiments, the device 14 may also automatically transmit performance information to the management center 12. The performance information may include, for example, a CPU utilization value for the device 14, a memory utilization value for the device 14, and a network interface bandwidth utilization value for the device 14. The performance data may also include, for example, the information obtained by the distributed network management poller module 68 of the device 14.

Figure 5:
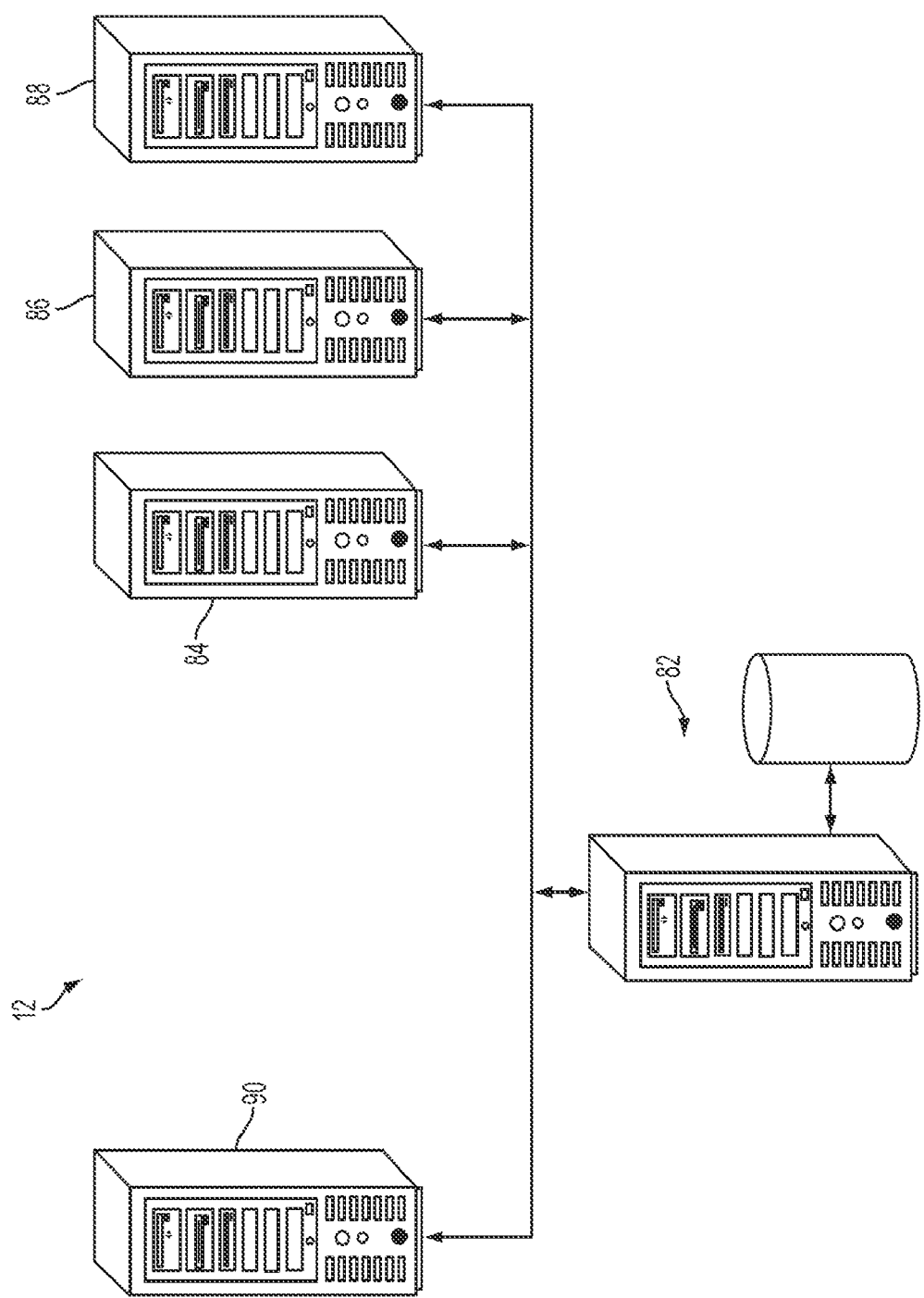
FIG. 5 illustrates various embodiments of a management center.

FIG. 5 illustrates various embodiments of the management center 12 of FIG. 1. The management center 12 includes a database cluster 82, an activation server 84, a logger server 86, a manager server 88 and a web-based management portal 90. The management center 12 is located external to any customer sites and may provide a shared infrastructure for multiple customers. According to various embodiments, the database cluster 82 includes a plurality of databases and structural query language (SQL) servers. According to various embodiments, the database cluster 82 includes a combination of structural query language servers and open source MySQL servers. The databases hold all of the data required by the activation server 84, the logger server 86, the manager server 88 and the web-based management portal 90.

Figure 6:
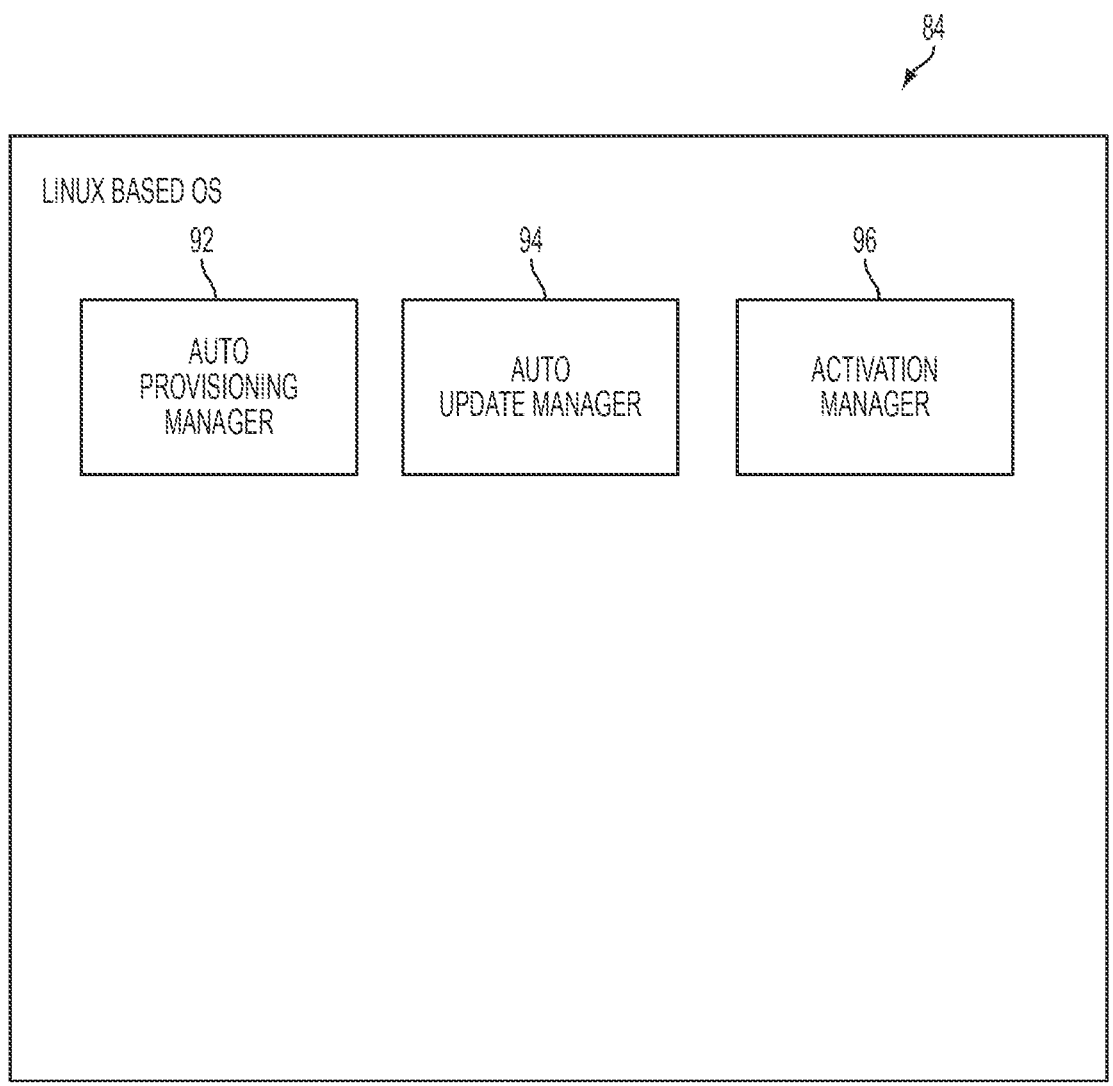
FIG. 6 illustrates various embodiments of a server.

FIG. 6 illustrates various embodiments of the activation server 84. The activation server 84 may include a Linux based operating system, and may include an auto-provisioning manager module 92, an auto-update manager module 94 and an activation manager module 96. The auto-provisioning manager module 92 is operable to configure any device 14 that is in the process of being activated. The auto-update manager module 94 is operable to update the operating system of any device 14 that is in the process of being activated. The auto-update manager module 94 is also operable to update the various databases and signature files used by applications resident on the device 14 (e.g., intrusion prevention, anti-virus, content filtering). The activation manager module 96 is operable to communicate with the back-end SQL servers of the database cluster 82 to gather the necessary data required by the auto-provisioning manager module 92 to generate device configurations. The activation manager module 96 is also operable to authenticate incoming devices 14 and determine their identity based on the activation key.

According to various embodiments, the activation server 84 is a collection of hosted servers that are utilized to set up the initial configuration of each device 14. Based on an activation key received from the device 14 when the device 14 is first installed, the activation server 84 automatically sends the appropriate configuration to the device 14. The activation server 84 also assigns the device 14 to a redundant pair of logger servers 86 and a redundant pair of manager servers 88.

Figure 7:
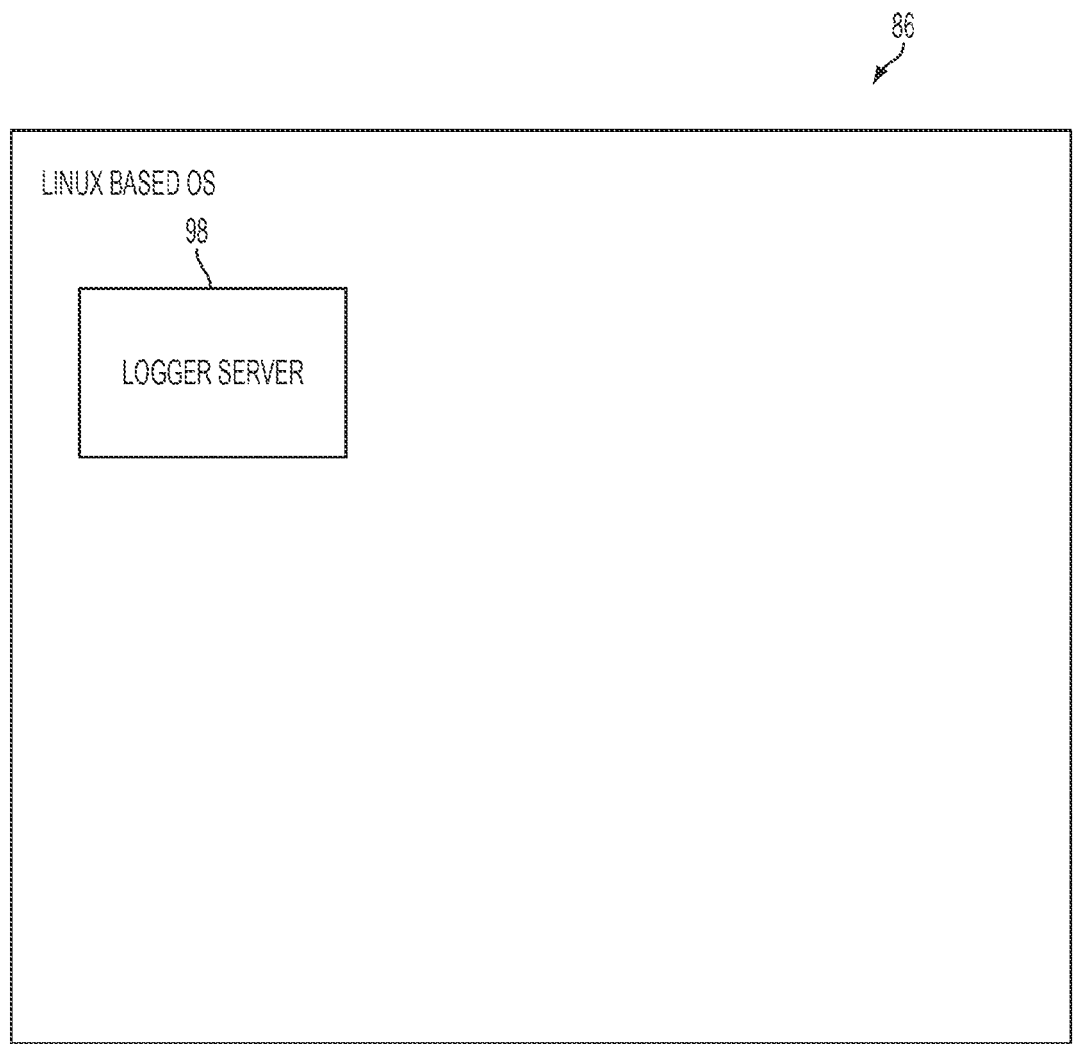
FIG. 7 illustrates various embodiments of a server.

FIG. 7 illustrates various embodiments of the logger server 86. The logger server 86 may include a Linux based operating system and a logger server module 98. According to various embodiments, the logger server 86 is a collection of hosted servers that receive log information from the devices 14 and correlates the information.

Figure 8:
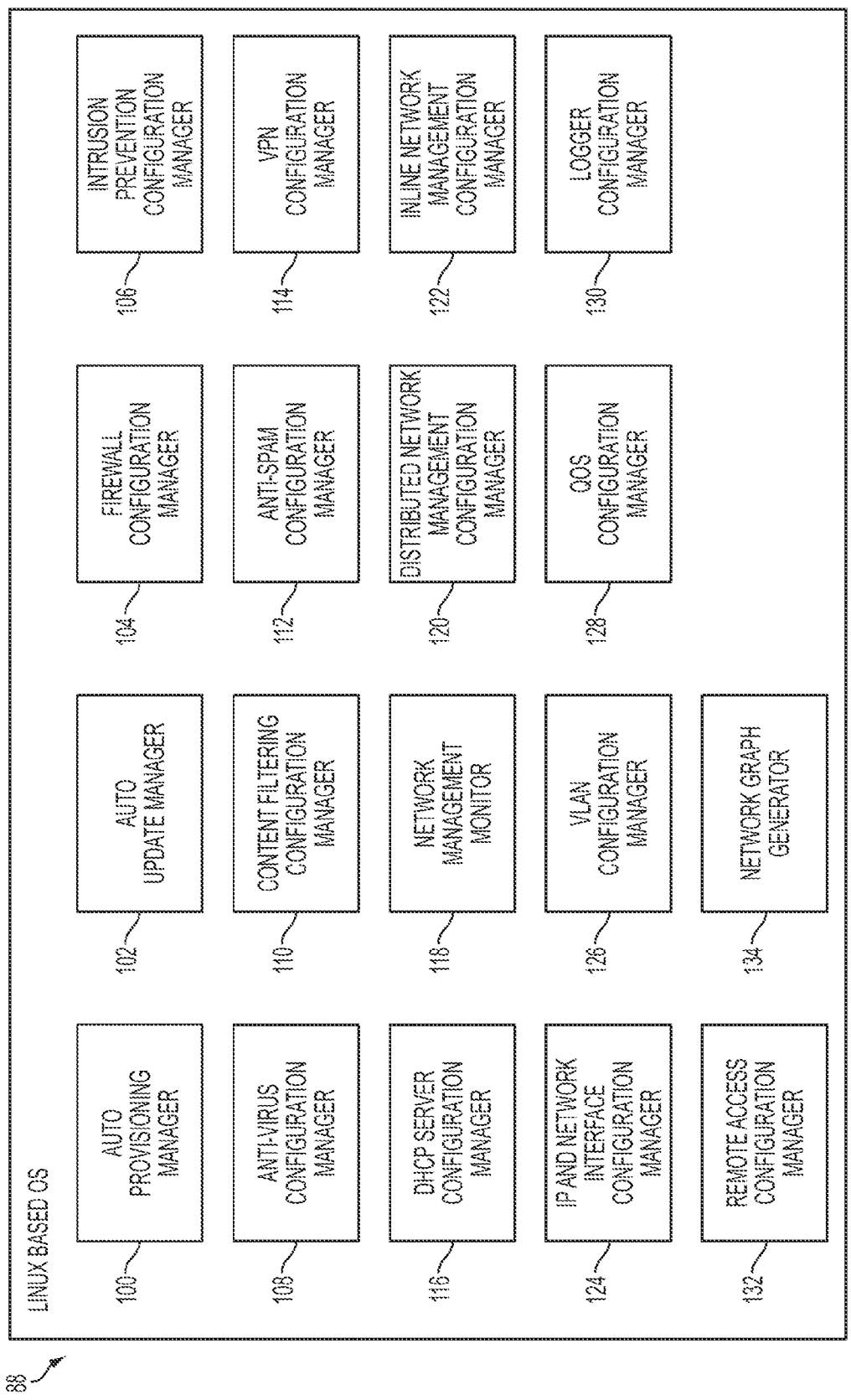
FIG. 8 illustrates various embodiments of a server.

FIG. 8 illustrates various embodiments of the manager server 88. The manager server 88 may include a Linux based operating system and the following modules: an auto-provisioning manager module 100, an auto-update manager module 102, a firewall configuration manager module 104, an intrusion prevention configuration manager module 106, an anti-virus configuration manager module 108, a content filtering configuration manager module 110, an anti-spam configuration manager module 112, a VPN configuration manager module 114, a DCHP server configuration manager module 116, a network management monitor module 118, a distributed network management configuration manager module 120, an inline network management configuration manager module 122, an IP and network interface configuration manager 124, a VLAN configuration manager module 126, a QOS configuration manager module 128, a logger configuration manager module 130, a remote access configuration manager module 132, and a network graph generator module 134.

According to various embodiments, the manager server 88 is a collection of servers that are utilized to manage the devices 14. The manager server 88 transmits the configuration and the updates to the device 14. The manager server 88 also monitors the device 14, stores performance data, and generates graphs for each device 14 and each network element monitored by the device 14. For example, the auto-update manager module 102 may periodically poll each device 14 and determines whether each device 14 has the most current version of the device operating system, the anti-virus signature database, the content filtering database and the intrusion protection database. If the auto-update manager module 102 determines that a particular device 14 does not have the most current version of the operating system and databases, the auto-update manager module 102 operate to will automatically transmit the appropriate update to the device 14.

The VPN configuration manager module 114 may automatically configure the VPN tunnels for each device 14. When the particular device 14 is first activated, the device 14 contacts the manager server 88 and reports its public Internet address. The auto-provisioning manager module 100 records the reported address and stores it in the database cluster 82. The VPN configuration manager module 114 may also gather all of the VPN configuration information from the database cluster 82 for each device 14 that is provisioned to have a VPN connection to the particular device 14. The VPN configuration manager module 114 may also create configuration files for each of the devices 14. After the manager server 88 transmits the configurations to each of the devices 14, secure encrypted tunnels are established between each of the devices 14.

When a particular device 14 is issued a new IP address, the device 14 automatically transmits its new IP address to the manager server 88. The auto-update manager module 102 responds to this IP address change and automatically generates new configurations for all of the devices 14 that have tunnels to the particular device 14. The VPN configuration manager module 114 automatically transmits the new configurations to the devices 14 and the encrypted tunnels automatically reconverge.

Figure 9:
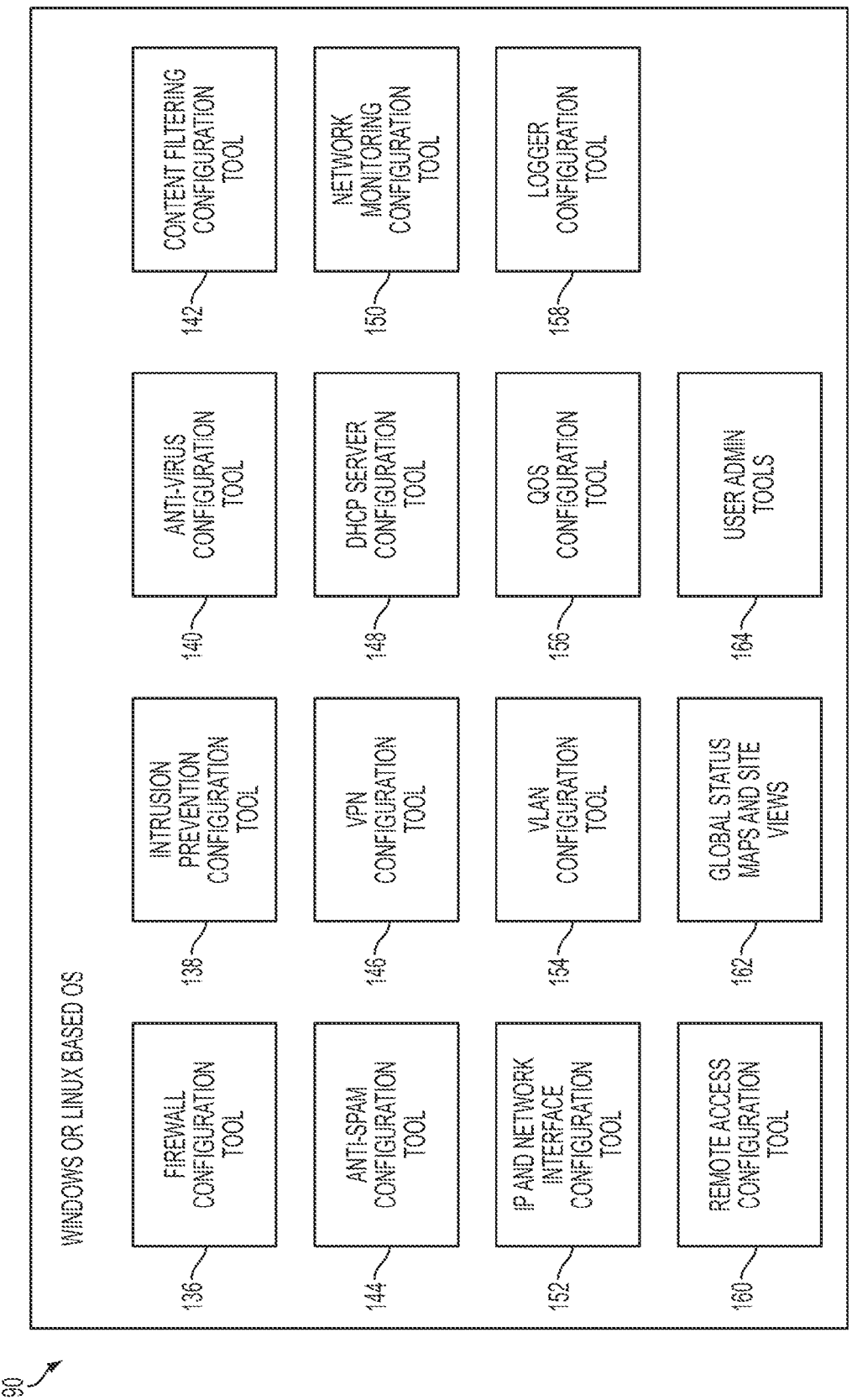
FIG. 9 illustrates various embodiments of a web-based management portal.

FIG. 9 illustrates various embodiments of the web-based management portal 90. The web-based management portal 90 may include a Windows or Linux based operating system and the following modules: a firewall configuration tool module 136, an intrusion prevention configuration tool module 138, an anti-virus configuration tool module 140, a content filtering configuration tool module 142, an anti-spam configuration tool module 144, a VPN configuration tool module 146, a DHCP server configuration tool module 148, a network monitoring configuration tool module 150, an IP and network interface configuration tool module 152, a VLAN configuration tool module 154, a QOS configuration tool module 156, a logger configuration tool module 158, a remote access configuration tool module 160, a global status maps and site views module 162 and a user administration tool module 164.

According to various embodiments, the web-based management portal 90 includes a collection of integrated centralized network management systems and a grouping of customer management tools. According to various embodiments, the web-based management portal 90 is a combination of many different web servers running Microsoft Internet Information Server or Apache. The web pages may be written in Microsoft's ASP.NET or PHP, and the web applications may interface with the SQL servers of the database cluster 82 to synchronize changes to the network environment as changes are made to the configuration of the devices 14 via the web-based management portal 90. The web-based management portal 90 may further include the capability for firewall management, intrusion prevention management, anti-virus management, content filtering management, anti-spam management, site to site and remote access virtual private network management, network monitoring, network configuration, account management and trouble ticketing.

The firewall configuration tool module 136 allows for centralized management of the firewall policies for each device 14. According to various embodiments, the firewall for a given local area network 18 resides on the device 14 associated with the given local area network 18. The firewall configuration tool module 136 allows a user to efficiently and securely manage all of the firewalls and define global policies that are easily applied to all firewalls at once. The firewall configuration tool module 136 also allows the customer to set custom firewall polices to each individual firewall. Each firewall can also have individual user permissions to restrict which user accounts can modify which firewalls. This capability may provide an administrator at each site the ability to manage their own firewall and yet restrict them from changing the configuration of any other firewalls in the network. A notification can be automatically sent to a group of administrators every time a change is made to a firewall policy. A firewall validation tool allows a user to run a security check against their current firewall settings and report on which ports are open and any vulnerabilities that are detected. The firewall configuration tool module 136 may also be used to view firewall log information.

The intrusion prevention configuration tool module 138 allows for the centralized management of the intrusion prevention rules for each device 14. According to various embodiments, the intrusion prevention system for a given local area network 18 resides on the device 14 associated with the given local area network 18. The intrusion prevention configuration tool module 138 allows a user to efficiently and securely manage all of the intrusion prevention systems and define global policies that are easily applied to all intrusion prevention systems at once. The intrusion prevention configuration tool module 138 also allows the customer to set custom intrusion prevention rules to each individual intrusion prevention system. Each intrusion prevention system can also have individual user permissions to restrict which user accounts can modify which intrusion prevention system. This capability may provide an administrator at each site the ability to manage their own intrusion prevention system and yet restrict them from changing the configuration of any other intrusion prevention systems in the network. An e-mail notification can be automatically sent to a group of administrators every time a change is made to an intrusion prevention system configuration. The intrusion prevention configuration tool module 138 may also be used to view intrusion protection log information.

The anti-virus configuration tool module 140 allows for the centralized management of the anti-virus policies for each device 14. According to various embodiments, the anti-virus service includes two anti-virus systems. The first anti-virus system for a given local area network 18 may be embodied as an anti-virus gateway service that resides on the device 14 associated with the given local area network 18. The second anti-virus system is a desktop anti-virus agent that resides on each customer computer (e.g., computer 36) that requires anti-virus protection. The anti-virus configuration tool module 140 allows a user to efficiently and securely manage both of the anti-virus systems and define global policies that are easily applied to all anti-virus systems at once. The anti-virus configuration tool module 140 also allows a user to set custom anti-virus policies to each individual anti-virus gateway. Each anti-virus system can also have individual user permissions to restrict which user accounts can modify which anti-virus system. This capability may provide an administrator at each site the ability to manage their own anti-virus policies and yet restrict them from changing the configuration of any other anti-virus systems in the network. An e-mail notification can be automatically sent to a group of administrators every time a change is made to an anti-virus system configuration. The anti-virus configuration tool module 140 may also be used to view anti-virus log information.

The content filtering configuration tool module 142 allows for the centralized management of the content filtering policies for each device 14. According to various embodiments, the content filtering system for a given local area network 18 resides on the device 14 associated with the given local area network 18. The content filtering configuration tool module 142 allows a user to efficiently and securely manage all of the content filtering systems and define global policies that are easily applied to all content filtering systems at once. The content filtering configuration tool module 142 also allows the customer to set custom content filtering policies to each individual content filtering system. Each content filtering system can also have individual user permissions to restrict which user accounts can modify which content filtering system. This capability may provide an administrator at each site the ability to manage their own content filtering system and yet restrict them from changing the configuration of any other content filtering systems in the network. An e-mail notification can be automatically sent to a group of administrators every time a change is made to a content filtering system configuration. The content filtering configuration tool module 142 may also be used to view content filtering log information.

The anti-spam configuration tool module 144 allows for the centralized management of the anti-spam policies for each device 14. According to various embodiments, the anti-spam system for a given local area network 18 resides on the device 14 associated with the given local area network 18. The anti-spam configuration tool module 144 allows a user to efficiently and securely manage all of the anti-spam systems and define global policies that are easily applied to all anti-spam systems at once. The anti-spam configuration tool module 144 also allows a user to set custom anti-spam policies to each individual anti-spam system. Each anti-spam system can also have individual user permissions to restrict which user accounts can modify which anti-spam system. This capability may provide an administrator at each site the ability to manage their own anti-spam system and yet restrict them from changing the configuration of any other anti-spam systems in the network. A notification can be automatically sent to a group of administrators every time a change is made to an anti-spam system configuration. The anti-spam configuration tool module 144 may also be used to view anti-spam log information.

The VPN configuration tool module 146 allows for the centralized management of the VPN policies for each device 14. According to various embodiments, the VPN system for a given local area network 18 resides on the device 14 associated with the given local area network 18. The VPN configuration tool module 146 allows a user to efficiently and securely manage all of the VPN systems and define global policies that are easily applied to all VPN systems at once. The VPN configuration tool module 146 also allows a user to set custom VPN policies to each individual VPN system. Each VPN system can also have individual user permissions to restrict which user accounts can modify which VPN system. This capability may provide an administrator at each site the ability to manage their own VPN system and yet restrict them from changing the configuration of any other VPN systems in the network. A notification can be automatically sent to a group of administrators every time a change is made to a VPN system configuration.

The DHCP server configuration tool module 148 allows for the centralized management of the DHCP server policies for each device 14. According to various embodiments, the DHCP server for a given local area network 18 resides on the device 14 associated with the given local area network 18. The DHCP server configuration tool module 148 allows a user to efficiently and securely manage all of the DHCP servers and define global policies that are easily applied to all DHCP servers at once. The DHCP server configuration tool module 148 also allows a user to set custom DHCP server policies to each individual DHCP server. Each DHCP server can also have individual user permissions to restrict which user accounts can modify which DHCP server. This capability may provide an administrator at each site the ability to manage their own DHCP server and yet restrict them from changing the configuration of any other DHCP server in the network. A notification can be automatically sent to a group of administrators every time a change is made to a DHCP server configuration.

The network monitoring configuration tool module 150 allows for the centralized management of the network monitoring policies for each device 14. According to various embodiments, the network monitoring system for a given local area network 18 resides on the device 14 associated with the given local area network 18. The network monitoring configuration tool module 150 allows a user to efficiently and securely manage all of the network monitoring systems and define global policies that are easily applied to all network monitoring systems at once. The network monitoring configuration tool module 150 also allows a user to set custom network monitoring policies to each individual network monitoring system. Each network monitoring system can also have individual user permissions to restrict which user accounts can modify which network monitoring system. This capability may provide an administrator at each site the ability to manage their own network monitoring system and yet restrict them from changing the configuration of any other network monitoring systems in the network. A notification can be automatically sent to a group of administrators every time a change is made to a network monitoring system configuration.

The IP and network interface configuration tool module 152 allows for the centralized management of the network configuration for each device 14. The centralized management of the network configuration may include, for example, managing IP Address, IP Types (static IP, DHCP, PPPOE), IP routing, Ethernet Trunking, VLANs, and QOS configuration. According to various embodiments, the IP and network interface configuration tool module 152 allows a user to efficiently and securely manage all of the devices 14. Each device 14 can also have individual user permissions to restrict which user accounts can modify the network configuration. This capability may provide an administrator at each site the ability to manage their own network configuration and yet restrict them from changing the configuration of any other devices 14 in the network. A notification can be automatically sent to a group of administrators every time a change is made to a device network configuration.

The global status maps and site views module 162 allows an authorized user to view the real-time status of their network, devices 14, and network elements that are monitored by the devices 14. This global status maps and site views module 162 provides a global map of the world, and countries and continents on this map are color coded to represent the underlying status of any devices 14 that reside in that region. For example a customer may have devices 14 in the United States, Japan, and Italy. If all of devices 14 and network elements monitored by the devices 14 are operating as expected, the countries on the map will be shown as green. When a device 14 in Japan ceases to operate as expected, the portion of the map representing Japan may turn red or yellow depending on the severity of the problem. The countries on the map can be selected to drill down into a lower level map. For example, the authorized user could select the United States from the world map and be presented with a state map of the United States. The individual states may be color coded to represent the underlying status of any devices 14 that reside in that state. For each state selected, a list of the sites and devices 14 in that state may be shown. The states on the map can be selected to drill down into a lower level sub map. The lower level sub map may show for example, a particular region, city, or customer site.

The global status maps and site views module 162 may read the latest data polled for each device 14 and the network elements that are monitored by them. It may also check the data against preset thresholds that determine what the status of each device 14 should be set to. It may determine the color for the lowest level map item that contains the device 14 and set the status appropriately. The status and color for each higher level map is set to represent the status of the underlying map. The color of each map item represents the severity of the most severe problem of a device 14 in that region. For example, if a device 14 is not operating as expected, all of the maps that have a region that include this device 14 will be shown as red. If a device 14 is operating in a manner associated with the color yellow, all of the maps that have a region that include this device 14 will be shown as yellow. A map region will only be shown as green if all devices 14 included in that map region are operating as expected.

The user administration tool module 164 allows for the centralized management of a number of functionalities. According to various embodiments, the user administration tool module 164 allows a user to set up an account profile and manage different aspects of a user profile such as name, address and account name. According to various embodiments, the user administration tool module 164 allows a user to manage all orders for secure network access platform products and services including a description and status of orders and allows a user to order additional items as well. According to various embodiments, the user administration tool module 164 allows a user to manage bills, including reading current invoices, making payment, updating billing information, downloading previous statements, and invoices.

According to various embodiments, the user administration tool module 164 allows a user to add and change user accounts, delete user accounts, change passwords, create new groups, move users into certain individuals and groups, and set permissions for those individuals and groups. The permissions may allow access to different portions of the web-based management portal 90. For example, a finance employee may be given access to only account administration tools for billing and order management. Similarly, a technical employee may be given access to only the technical sections of the web-based management portal 90 and not to billing center or order management sections. According to various embodiments, the user administration tool module 164 may allow a user to open trouble tickets, track the status of existing trouble tickets, and run some of the diagnostic tools available in the secure network access platform environment.

According to various embodiments, the management center 12 may correlate all information received from the devices 14, including performance information received from the devices 14.

Each of the modules described hereinabove may be implemented as microcode configured into the logic of a processor, or may be implemented as programmable microcode stored in electrically erasable programmable read only memories. According to other embodiments, the modules may be implemented by software to be executed by a processor. The software may utilize any suitable algorithms, computing language (e.g., C, C++, Java, JavaScript, Visual Basic, VBScript, Delphi), and/or object oriented techniques and may be embodied permanently or temporarily in any type of computer, computer system, device, machine, component, physical or virtual equipment, storage medium, or propagated signal capable of delivering instructions. The software may be stored as a series of instructions or commands on a computer readable medium (e.g., device, disk, or propagated signal) such that when a computer reads the medium, the described functions are performed.

Although the system 10 is shown in FIG. 1 as having wired data pathways, according to various embodiments, the network elements may be interconnected through a secure network having wired or wireless data pathways. The secure network may include any type of delivery system comprising a local area secure network (e.g., Ethernet), a wide area secure network (e.g., the Internet and/or World Wide Web), a telephone secure network, a packet-switched secure network, a radio secure network, a television secure network, a cable secure network, a satellite secure network, and/or any other wired or wireless communications secure network configured to carry data. The secure network may also include additional elements, such as intermediate nodes, proxy servers, routers, switches, and adapters configured to direct and/or deliver data.

Figure 10:
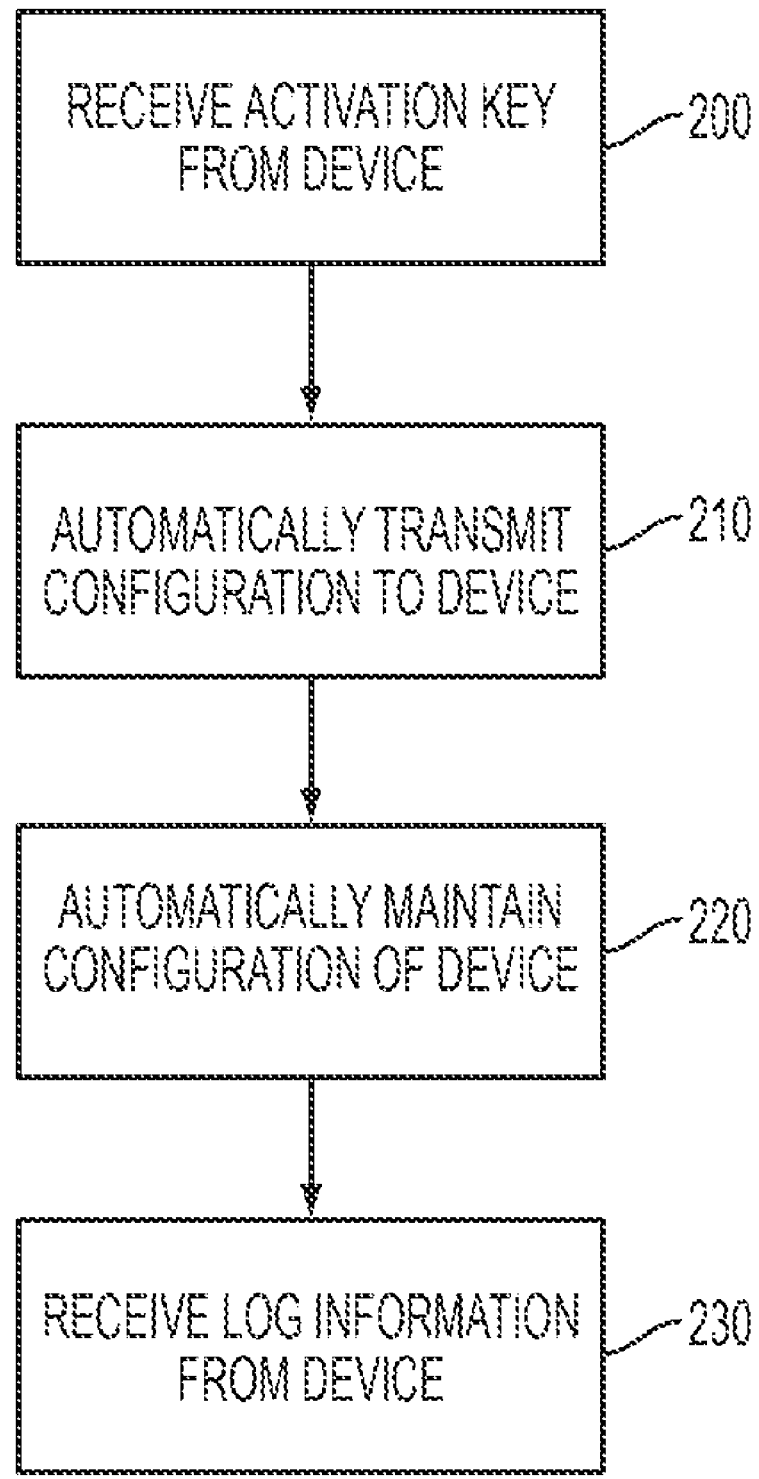
FIG. 10 illustrates various embodiments of a method of managing a network.

FIG. 10 illustrates various embodiments of a method of managing a network. According to various embodiments, the method includes receiving an activation key automatically transmitted from a device connected to the network, automatically transmitting a configuration to the device, automatically maintaining the configuration of the device, and receiving log information from the device. The network may be, for example, a local area network, or a number of local area networks that rely on the Internet to communicate with one another. The device may be, for example, the device 14 described hereinabove. The method may be utilized to provide an automated managed service for a complex network environment.

The process starts at block 200, where the management center 12 receives an activation key automatically transmitted from a device 14 connected to the network. Prior to the start of the process at block 200, the configuration of the device 14 is provisioned by an entity such as, for example, an administrator or a managed service provider. The entity may initiate the provisioning of the device 14 by logging onto the web-based management portal 90 and entering a license key associated with the device 14. The license key may be generated by a managed service provider and may be issued with the purchase of the device 14. The license key may include information such as the product type of the device 14, the term length of the license associated with the device 14, and the seller of the license. A hash function may be used to embed the information in the key to obscure the data, and the data may be read by the network manager to verify the authenticity of the license key.

Once the license key is received by the web-based management portal 90, the configuration of the device 14 may be provisioned via the web-based management portal 90. Setting the configuration of the device 14 may include setting the IP address of the device 14, and setting the configurations for the firewall configuration, the intrusion prevention configuration, the anti-virus configuration, the content filtering configuration, the anti-spam configuration, the VPN configuration, the DHCP server configuration, the network management configuration, the network interface configuration, the VLAN configuration, the QOS configuration and any other device configurations. Each configuration provisioned for the device 14 may be stored in the database cluster 82. According to various embodiments, a default configuration may be selected for the device 14.

During the provisioning process, an activation key associated with the device 14 is generated and may be printed out or e-mailed for later use. The configuration of the device 14 and the generation of the activation key may be completed from any location by accessing the web-based management portal 90.

Once the provisioning process is completed, the device 14 may be installed at the customer location. After the device 14 is connected to the local area network 18, the device 14 automatically attempts to DHCP for a wide area network IP address. As most Internet service providers assign IP addresses using DHCP, in most cases the device 14 will automatically obtain its wide area network IP address. For Internet service providers who do not use DHCP, the wide area network IP address can be obtained using PPPOE. Alternatively, a wide area network IP address may be statically assigned to the device 14.

According to various embodiments, the device 14 is configured with the DNS names of a number of the hosted servers that comprise the activation server 84. Once the device 14 obtains a wide area network IP address, the device 14 automatically attempts to communicate with one of the hosted servers that comprise the activation server 84. When the communication is successful, the activation key is entered and the device 14 transmits the activation key to the activation server 84. The activation key may be entered by an installer of the device 14. The process associated with block 200 may be repeated for any number of devices 14.

From block 200, the process advances to block 210, where the activation server 84 automatically transmits the configuration provisioned at block 200 to the device 14. After the device 14 receives its configuration from the activation server 84, an installer of the device 14 may be prompted to reboot the device 14. Once the device 14 reboots, the device 14 automatically connects to its assigned manager server 88 and the installation of the device 14 is complete. The process associated with block 210 may be repeated for any number of devices 14

From block 210, the process advances to block 220, where the management center 12 automatically maintains the configuration of the device 14. According to various embodiments, a flag is set in the database servers of the database cluster 82 when a change to the configuration of the device 14 is entered via the web-based management portal 90. According to various embodiments, the auto-provisioning manager module 100 periodically polls the database cluster 82 looking for changes to the configurations of the devices 14 managed by the manager server 88. When the auto-provisioning manager module 100 detects a device configuration that needs to be changed, the appropriate module (e.g., firewall, intrusion prevention, anti-virus, etc.) will generate the new configuration for the particular service and make the necessary configuration changes to the device 14 that needs to be updated. The process associated with block 220 may be repeated for any number of devices 14.

From block 220, the process advances to block 230, where the logger manager 86 receives log information from the device 14. As explained previously, the log information received from each device 14 may be compressed and encrypted, and may represent information associated with, for example, a firewall system, an intrusion prevention system, an anti-virus system, a content filtering system, an anti-spam system, etc. residing at the particular device 14. Once the logger manager 86 receives the log information, the logger manager 86 correlates the log information and makes it available to other elements of the management center 12. The correlated information may be utilized to determine both the real time and historical performance of the network.

Figure 11:
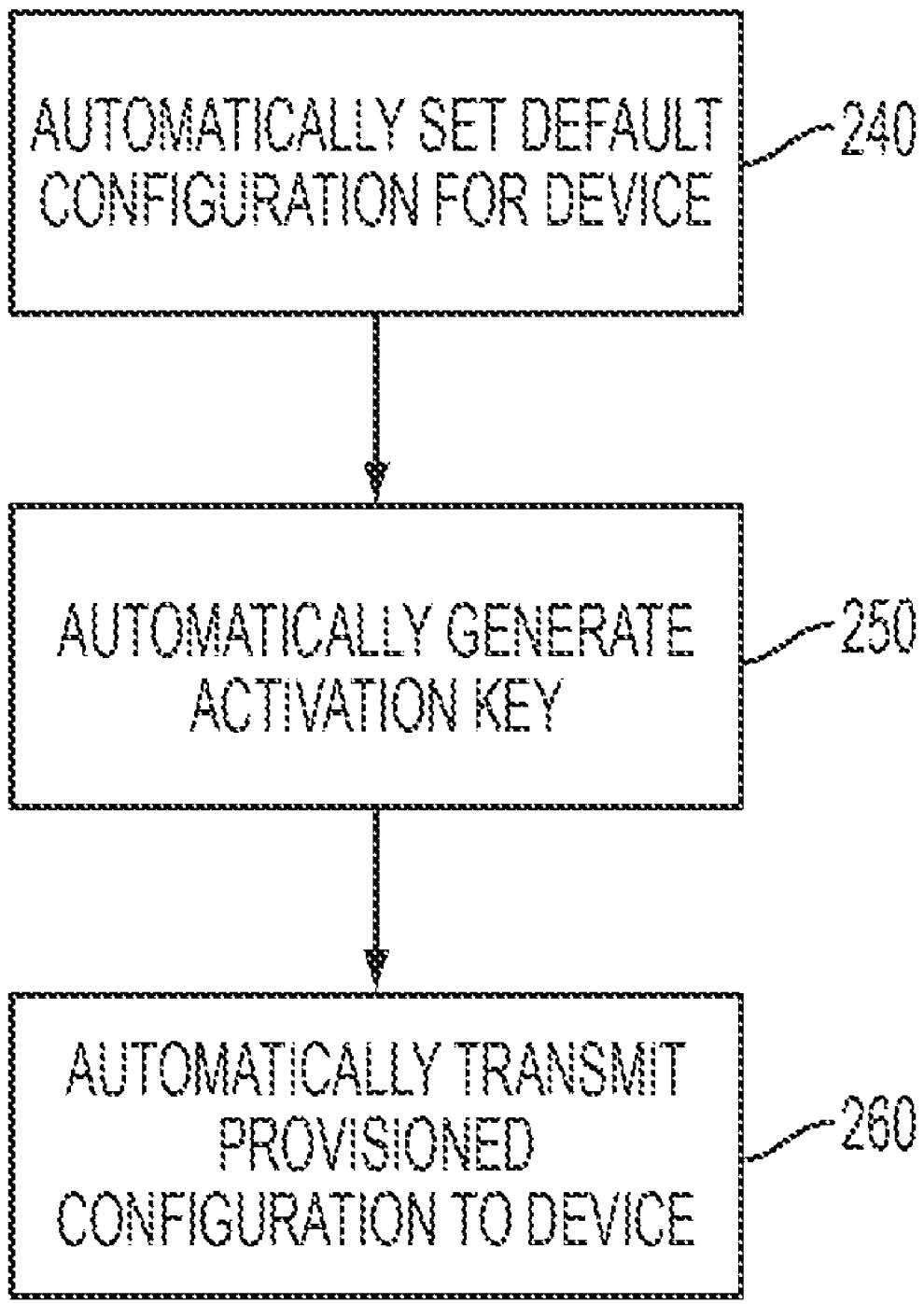
FIG. 11 illustrates various embodiments of a method of managing a network.

FIG. 11 illustrates various embodiments of a method of managing a network. According to various embodiments, the method includes automatically setting a default configuration for the device, automatically generating an activation key associated with a device, and automatically transmitting a provisioned configuration to the device after the device is connected to the network. The network may be, for example, a local area network, or a number of local area networks that rely on the Internet to communicate with one another. The device may be, for example, the device 14 described hereinabove. The method may be utilized to provide an automated managed service for a complex network environment.

The process starts at block 240, where a default configuration is set for the device 14. According to various embodiments, the web-based management portal 90 may provide the default configuration that serves as the basis for the device configuration. The process associated with block 240 may be repeated for any number of devices 14.

From block 240, the process advances to block 250, where an activation key associated with a device is automatically generated. According to various embodiments, the activation key may be generated by the web-based management portal 90 during the provisioning of the device 14. The provisioning of the device 14 may include changing some of the settings of the default configuration. The process associated with block 250 may be repeated for any number of devices 14.

From block 250, the process advances to block 260, where the provisioned configuration is automatically transmitted to the device 14 after the device 14 is connected to the network. According to various embodiments, the activation server 84 may automatically transmit a provisioned configuration to the device 14 after the device 14 is connected to the network. The process associated with block 260 may be repeated for any number of devices 14.

Figure 12:
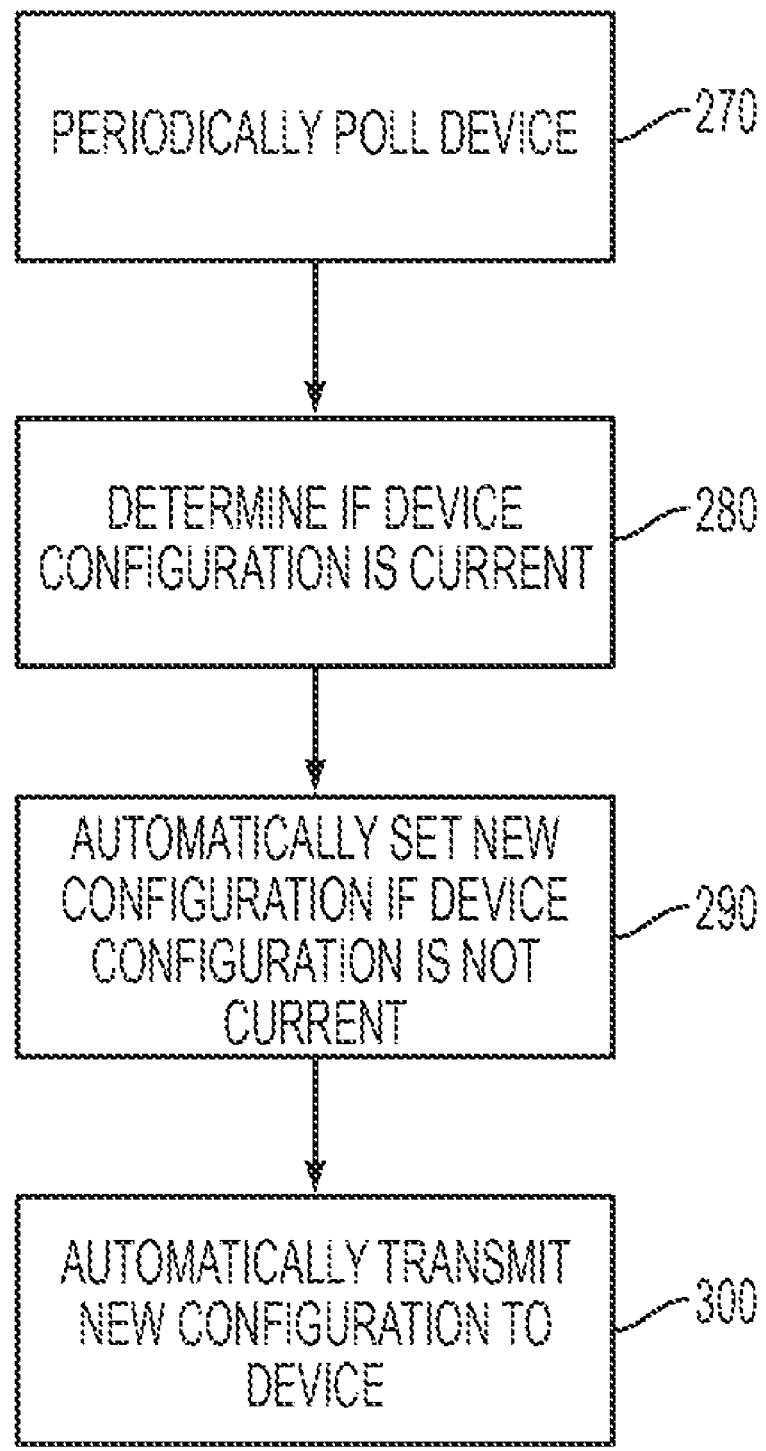
FIG. 12 illustrates various embodiments of a method of managing a network.

FIG. 12 illustrates various embodiments of a method of managing a network. According to various embodiments, the method includes periodically polling a device connected to the network, automatically determining whether a configuration of the device is current, automatically setting a new configuration for the device when the configuration is not current, and automatically transmitting the new configuration to the device. The network may be, for example, a local area network, or a number of local area networks that rely on the Internet to communicate with one another. The device may be, for example, the device 14 described hereinabove. The method may be utilized to provide an automated managed service for a complex network environment.

The process starts at block 270, where a device 14 connected to the network is periodically polled. According to various embodiments, the periodic polling may be conducted by the manager server 88. The process associated with block 270 maybe repeated for any number of devices 14.

From block 270, the process advances to block 280, where it is automatically determined whether the configuration of the device 14 is current. According to various embodiments, the automatic determination may be made by the manager server 88. The process associated with block 280 maybe repeated for any number of devices 14.

From block 280, the process advances to block 290, where a new configuration is automatically set for the device 14 when the configuration of the device 14 is not current. According to various embodiments, the new configuration may be automatically set by the manager server 88. The process associated with block 290 maybe repeated for any number of devices 14.

From block 290, the process advances to block 300, where the new configuration is automatically transmitted to the device 14. According to various embodiments, the new configuration may be automatically transmitted to the device 14 by the manager server 88. The process associated with block 300 maybe repeated for any number of devices 14.

Figure 13:
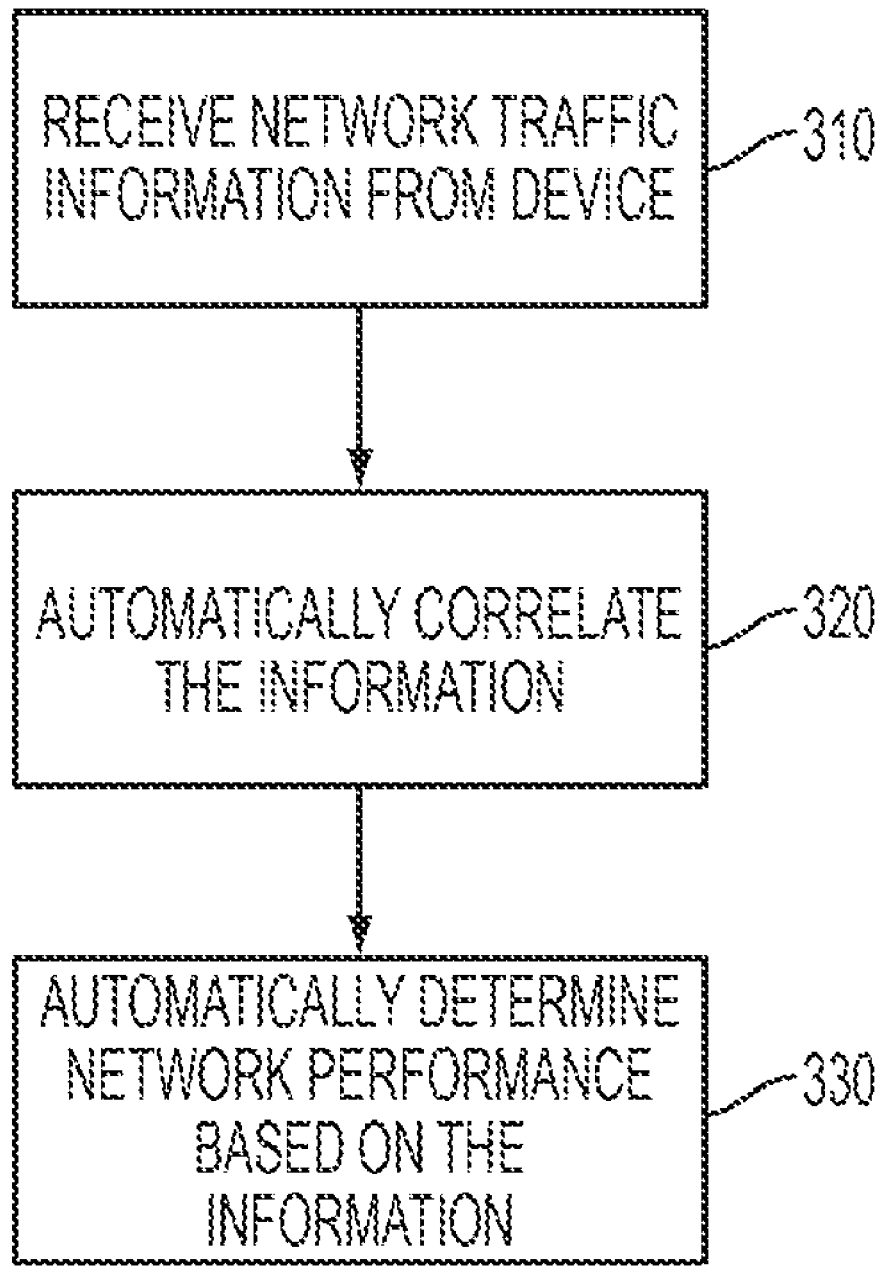
FIG. 13 illustrates various embodiments of a method of managing a network.

FIG. 13 illustrates various embodiments of a method of managing a network. According to various embodiments, the method includes receiving network traffic information from a device connected to the network, automatically correlating the information, and automatically determining network performance based on the information. The network may be, for example, a local area network, or a number of local area networks that rely on the Internet to communicate with one another. The device may be, for example, the device 14 described hereinabove. The method may be utilized to provide an automated managed service for a complex network environment.

The process starts at block 310, where network traffic information is received from a device 14 connected to the network. The network traffic information may represent information that travels from one device 14 to another device 14. According to various embodiments, the network traffic information is captured at the device 14 and may include, for example, source/destination IP address, protocol, sequence number and source/destination port. According to various embodiments, the network traffic information transmitted from the device 14 is received by the manager server 88. The process associated with block 310 maybe repeated for any number of devices 14.

From block 310, the process advances to block 320, where the information is correlated. According to various embodiments the information may be correlated with network traffic information transmitted from any number of devices 14. According to various embodiments, the correlation of the information is conducted by the manager server 88.

From block 320, the process advances to block 330, where the network performance is determined based on the information. According to various embodiments, the network performance determination is made by the manager server 88. For example, assume that ten VOIP packets leave a first device 14 destined for a second device 14. As explained previously, the first device 14 may record the exact time each VOIP packet leaves, and the source/destination IP Address, protocol, sequence number and source/destination port for each VOIP packet. The first device 14 may then send this information to the manager server 88. Further assume that these ten VOIP packets travel over the Internet 16, the third and eighth VOIP packets are lost, dropped by a router that is over-utilized. The second device 14 will only see eight VOIP packets arrive, not knowing that the third and eighth packets were lost. The second device 14 may then record the exact time each packet is received and the source/destination IP Address, protocol, sequence number, and source/destination port for each received packet. The second device 14 may then send this information to the manager server 88. The manager server 88 may then examine the information transmitted from the first and second devices 12, 14 and determine, based on the IP Address, protocol, sequence number, and source/destination port that the packets recorded by both the first and second devices 14 are part of the same packet stream. Armed with this information, the manager server 88 may then determine the exact latency and jitter of each packet, and the packet loss (20% in this example) on a real application data stream. The process associated with block 330 may be repeated for network traffic information received from any number of devices 14.

Figure 14:
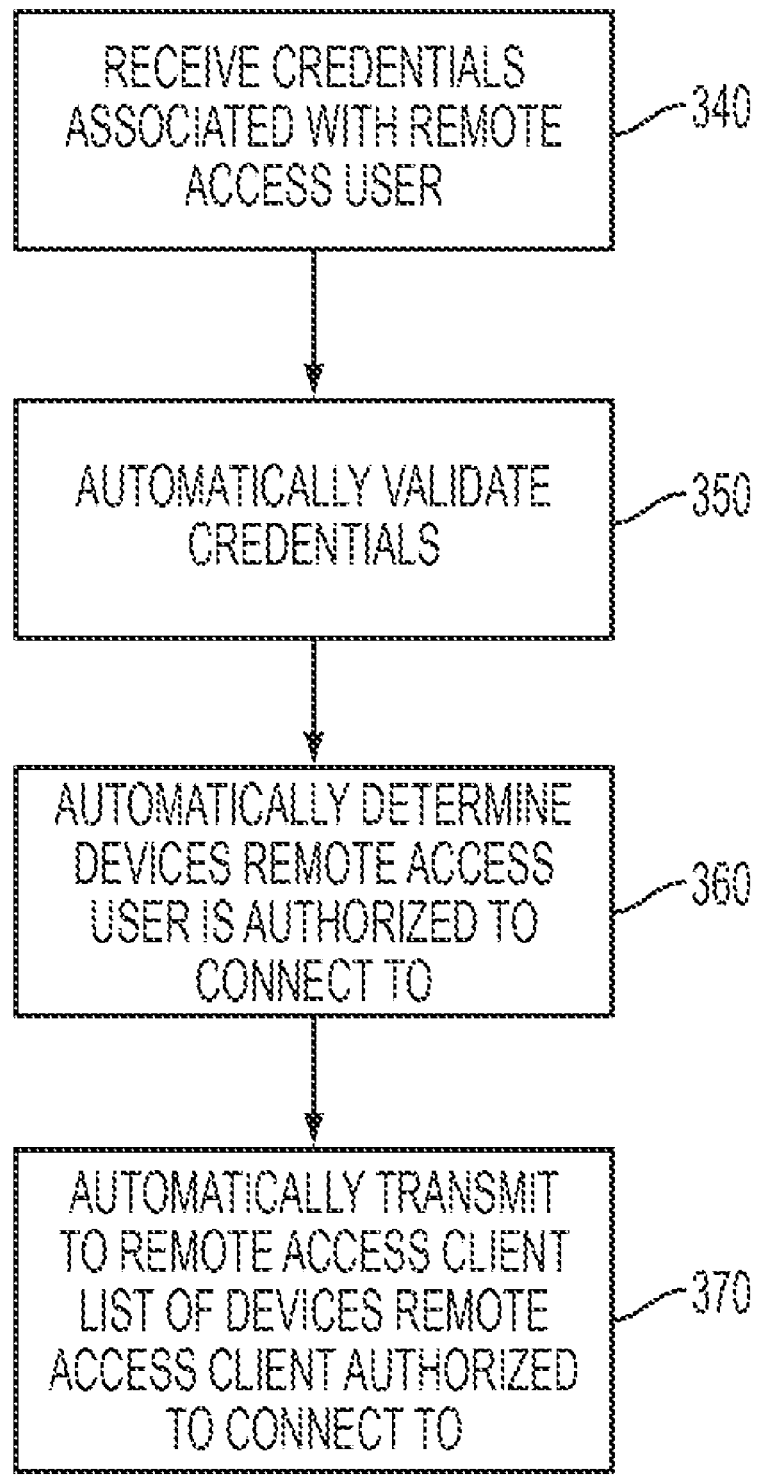
FIG. 14 illustrates various embodiments of a method of managing a network.

FIG. 14 illustrates various embodiments of a method of managing a network. According to various embodiments, the method includes receiving credentials associated with a remote access user, automatically validating the credentials, automatically determining which devices connected to the network the remote access user is authorized to connect to, and automatically transmitting to a remote access client a list of devices the remote access user is authorized to connect to. The network may be, for example, a local area network, or a number of local area networks that rely on the Internet to communicate with one another. The device may be, for example, the device 14 described hereinabove. The method may be utilized to provide an automated managed service for a complex network environment.

The process starts at block 340, where credentials associated with a remote access user is received from a remote access client. The remote access user is a user who is located at a site that does not have a device 14 associated therewith. According to various embodiments, the credentials are received by the web-based management portal 90. The remote access client may be implemented as a software client installed on a personal computer such as, for example, a desktop computer or a laptop computer. According to various embodiments, when the software client is launched, it requires the remote access user to input their credentials (e.g., company ID, username, password). After the remote access user enters the credentials, the software client may make a secure socket layer connection to the web-based management portal 90. The process associated with block 340 may be repeated for any number of remote access users.

From block 340, the process advances to block 350, where the credentials are automatically validated. According to various embodiments, the credentials may be automatically validated by the web-based management portal 90. If the credentials are not valid, the web-based management portal 90 may return an error message to the remote access client which may then prompt the remote access user to reenter their credentials. The process associated with block 350 may be repeated for any number of remote access users.

From block 350, the process advance to block 360, where it is determined which devices 14 connected to the network the remote access user is authorized to connect to. According to various embodiments, the determination is made by the web-based management portal 90. The process associated with block 360 may be repeated for any number of remote access users.

From block 360, the process advances to block 370, where a list of the devices 14 is automatically transmitted to a remote access client associated with the remote access user. According to various embodiments, the list is automatically transmitted from the web-based management portal 90. Once the list is presented to the remote access user and a particular device 14 is selected, an encrypted tunnel may be established between the personal computer and the selected device 14. The process associated with block 370 may be repeated for any number of remote access users.

Each of the methods described above may be performed by the system 10 of FIG. 1 or by any suitable type of hardware (e.g., device, computer, computer system, equipment, component); software (e.g., program, application, instruction set, code); storage medium (e.g., disk, device, propagated signal); or combination thereof.

While several embodiments of the invention have been described, it should be apparent, however, that various modifications, alterations and adaptations to those embodiments may occur to persons skilled in the art with the attainment of some or all of the advantages of the disclosed invention. For example, the system 10 may further include a plurality of graphical user interfaces to facilitate the management of the network. The graphical user interfaces may be presented through an interactive computer screen to solicit information from and present information to a user in conjunction with the described systems and methods. The graphical user interfaces may be presented through a client system including a personal computer running a browser application and having various input/output devices (e.g., keyboard, mouse, touch screen, etc.) for receiving user input. It is therefore intended to cover all such modifications, alterations and adaptations without departing from the scope and spirit of the disclosed invention as defined by the appended claims.

What is claimed is:

1. A method for providing a managed network, comprising:
   in a management center, setting at least one configuration to be transmitted to a first network management device, the at least one configuration to cause the first network management device to provide a corresponding at least one managed network service for a first network after the at least one configuration is transmitted to and received by the first network management device, wherein setting the at least one configuration comprises setting:
      a quality of service (QOS) configuration to cause the first network management device to enable selective transmission of information by the first network management device based on a relative metric of the information; and
   wherein setting the at lest one configuration further comprises setting at least one of:
      an anti-virus configuration to cause the first network management device to provide an anti-virus service;
      a content filtering configuration to cause the first network management device to provide a content filtering service;
      an anti-spam configuration to cause the first network management device to provide an anti-spam service;
      a virtual private network (VPN) configuration to cause the first network management device to provide a VPN service, the VPN service to enable the first network management device to communicate with at least one of: a second network management device located at a second location, a remote access client, and the management center;
      an internet protocol (IP) routing and network interface configuration to cause the first network management device to provide an IP routing and network interface service; and
      a device monitoring configuration to cause the first network management device to provide a device monitoring service, the device monitoring service to monitor one or more network elements, the one or more network elements connected to the first network and external to the first network management device; and
   transmitting the at least one configuration to the first network management device via a second network in response to receiving an activation key at the management center, the activation key transmitted from the first network management device to the management center via the second network after the first network management device is connected to the second network at a first location.

2. The method of claim 1, wherein setting at least one configuration of a first network management device comprises generating the activation key.

3. The method of claim 1, comprising updating the at least one configuration within the first network management device.

4. The method of claim 3, wherein updating the at least one configuration within the first network management device comprises:
  periodically polling the first network management device;
  determining whether the at least one configuration of the first network management device is current;
  setting a new configuration for each of the at least one configuration that is not current; and
  transmitting the new configurations to the first network management device.

5. The method of claim 1, comprising receiving log information from the first network management device, the log information associated with at least one managed network service.

6. The method of claim 5, comprising:
  correlating the received log information; and
  determining one or more of a real time performance and a historical performance of the first network based on the correlated log information.

7. The method of claim 1, comprising:
  receiving performance information from the first network management device;
  correlating the received performance information; and
  determining one or more of a real time performance and a historical performance of the first network based on the correlated performance information.

8. The method of claim 7, wherein receiving performance information from the first network management device comprises receiving at least one of the following:
  a CPU utilization value;
  a memory utilization; and
  a network interface bandwidth utilization value.

9. The method of claim 7, wherein receiving performance information from the first network management device comprises receiving performance information gathered from one or more network elements connected to the first network and external to the first network management device.

10. The method of claim 9, wherein receiving performance information gathered from the one or more network elements comprises receiving at least one of the following:
  a reachability value;
  a latency value; and
  a CPU utilization value.

11. The method of claim 1, wherein the first network management device is in communication with the first network via an ethernet port of the first network management device.

12. A system for managing a network, the system comprising:
  a first network management device comprising a processor and a memory, the first network management device to provide at least one managed network service for a first network after a corresponding at least one configuration is transmitted to and received by the first network management device; and
  a management center to communicate with the first network management device via a second network, the management center to:
    set the least one configuration to be transmitted to a first network management device, wherein the at least one configuration comprises:
      a quality of service (QOS) configuration to cause the first network management device to enable selective transmission of information by the first network management device based on a relative metric of the information; and
      at least one of:
        an anti-virus configuration to cause the first network management device to provide an anti-virus service;
        a content filtering configuration to cause the first network management device to provide a content filtering service;
        an anti-spam configuration to cause the first network management device to provide an anti-spam service;
        a virtual private network (VPN) configuration to cause the first network management device to provide a VPN service, the VPN service to enable the first network management device to communicate with at least one of: a second network management device located at a second location, a remote access client, and the management center;
        an internet protocol (IP) routing and network interface configuration to cause the first network management device to provide an IP routing and network interface service; and
        a device monitoring configuration to cause the first network management device to provide a device monitoring service, the device monitoring service to monitor one or more network elements, the one or more network elements connected to the first network and external to the first network management device; and
    transmit the at least one configuration to the first network management device via the second network in response to receiving an activation key at the management center, the activation key transmitted from the first network management device to the management center via the second network after the first network management device is connected to the second network at a first location.

13. The system of claim 12, wherein the management center is to update the at least one configuration within the first network management device.

14. The system of claim 13, wherein the management center is to:
  periodically poll the first network management device;
  determine whether the at least one configuration of the first network management device is current;
  set a new configuration for each of the at least one configuration that is not current; and
  transmit the new configurations to the first network management device.

15. The system of claim 12, wherein the management center is to receive log information from the first network management device, the log information associated with the at least one managed network service.

16. The system of claim 15, wherein the management center is to:
  correlate the received log information; and
  determine one or more of a real time performance and a historical performance of the first network based on the correlated log information.

17. The system of claim 12, wherein the management center is to:
- receive performance information from the first network management device;
- correlate the received performance information; and
- determine one or more of a real time performance and a historical performance of the first network based on the correlated information.

18. The system of claim 17, wherein performance information comprises at least one of the following:
- a CPU utilization value;
- a memory utilization value; and
- a network interface bandwidth utilization value.

19. The system of claim 17, wherein the performance information comprises at least one of the following:
- a reachability value;
- a latency value; and
- a CPU utilization value.

20. The system of claim 12, wherein the first network management device is in communication with the first network via an ethernet port of the first network management device.

* * * * *